US011310350B2

(12) United States Patent
Sarikaya et al.

(10) Patent No.: US 11,310,350 B2
(45) Date of Patent: Apr. 19, 2022

(54) NETWORK BRIDGE BETWEEN DIFFERENT NETWORK COMMUNICATION PROTOCOLS

(71) Applicant: Futurewei Technologies, Inc., Plano, TX (US)

(72) Inventors: Behcet Sarikaya, Dallas, TX (US); Yangsong Xia, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 156 days.

(21) Appl. No.: 15/860,129

(22) Filed: Jan. 2, 2018

(65) Prior Publication Data
US 2018/0191872 A1    Jul. 5, 2018

Related U.S. Application Data

(60) Provisional application No. 62/442,242, filed on Jan. 4, 2017.

(51) Int. Cl.
*H04L 12/00* (2006.01)
*H04L 69/08* (2022.01)
(Continued)

(52) U.S. Cl.
CPC .............. *H04L 69/08* (2013.01); *H04L 12/46* (2013.01); *H04L 12/4625* (2013.01);
(Continued)

(58) Field of Classification Search
None
See application file for complete search history.

(56) References Cited

U.S. PATENT DOCUMENTS

2002/0039357 A1*  4/2002  Lipasti ................... H04W 8/26
                                                      370/338
2003/0039260 A1*  2/2003  Fujisawa ........... H04L 29/12018
                                                      370/401
(Continued)

FOREIGN PATENT DOCUMENTS

CN    1452343 A    10/2003
CN    1859443 A    11/2006
(Continued)

OTHER PUBLICATIONS

IEEE Recommended Practice for Transport of Key Management Protocol (KMP) Datagrams (Year: 2016).*
(Continued)

*Primary Examiner* — Noel R Beharry
*Assistant Examiner* — Lionel Preval
(74) *Attorney, Agent, or Firm* — Schwegman Lundberg & Woessner, P.A.

(57) ABSTRACT

A network coordinator device comprises a processor, a memory, a first port to operatively couple the processor to first network that uses media access control (MAC) addresses of a first size, and a second port to operatively couple the processor to second network that uses MAC addresses of a second size. The processor is configured to perform a network bridging protocol to bridge data frames communicated between the first network and the second network, including to translate communications between a device of the first network having the first size MAC address and a device of the second network having the second size MAC address, and adapt a frame format of the first network protocol to a frame format of the second network protocol. The adapting the frame formatting includes fragmenting data frames of the first network protocol when needed using a fragmentation format of the second network protocol.

20 Claims, 5 Drawing Sheets

(51) Int. Cl.

| | |
|---|---|
| *H04L 61/2567* | (2022.01) |
| *H04L 101/622* | (2022.01) |
| *H04L 12/46* | (2006.01) |
| *H04L 69/18* | (2022.01) |
| *H04W 8/26* | (2009.01) |
| *H04L 61/2596* | (2022.01) |
| *H04L 101/681* | (2022.01) |
| *H04W 92/02* | (2009.01) |

(52) U.S. Cl.
CPC ...... *H04L 61/2567* (2013.01); *H04L 61/2596* (2013.01); *H04L 61/6022* (2013.01); *H04L 61/6081* (2013.01); *H04L 69/18* (2013.01); *H04W 8/26* (2013.01); *H04W 92/02* (2013.01)

(56) References Cited

U.S. PATENT DOCUMENTS

| | | | | |
|---|---|---|---|---|
| 2005/0243787 | A1* | 11/2005 | Hong | H04W 92/02 370/338 |
| 2010/0271980 | A1 | 10/2010 | Kini et al. | |
| 2012/0163362 | A1 | 6/2012 | Noh et al. | |
| 2012/0331179 | A1 | 12/2012 | Chen | |
| 2013/0070745 | A1* | 3/2013 | Nixon | H04W 84/02 370/338 |
| 2013/0215810 | A1* | 8/2013 | Wang | H04L 69/22 370/311 |
| 2015/0074228 | A1* | 3/2015 | Drake | H04W 92/02 709/218 |
| 2015/0381565 | A1* | 12/2015 | Thaler | H04L 61/2038 370/389 |
| 2017/0150422 | A1* | 5/2017 | Yan | H04L 67/2861 |
| 2018/0241716 | A1* | 8/2018 | Roberts | H04L 61/2092 |

FOREIGN PATENT DOCUMENTS

| | | |
|---|---|---|
| CN | 1918558 A | 2/2007 |
| CN | 102422608 A | 4/2012 |
| CN | 102694712 A | 9/2012 |
| CN | 103428063 A | 12/2013 |
| CN | 104144228 A | 11/2014 |
| EP | 2428007 B1 | 7/2013 |
| EP | 2801901 A1 | 11/2014 |

OTHER PUBLICATIONS

Adapting bridging 64 bit MACS with 48 bit MACs (Year: 2015).*
"Guidelines for Use of Extended Unique Identifier (EUI), Organizationally Unique Identifier (OUI), and Company ID (CID)", IEEE Standards Association, (Aug. 3, 2017), 19 pgs.
"IEEE P802.1CS/D1.6, Draft Standard for Local and metropolitan area networks: Link-local Registration Protocol", LAN MAN Standards Committee of the IEEE Computer Society, Copyright 2018 The Institute of Electrical and Electronics Engineers, Inc., (Aug. 2018), 141 pgs.
"IEEE Standard for Local and metropolitan area networks: Bridges and Bridged Networks", IEEE Standards Association, IEEE Computer Society, Sponsored by the LAN/MAN Standards Committee, IEEE Std 802.1Q-2014, (2014), 1832 pgs.
"IEEE Standard for Local and metropolitan area networks: Media Access Control (MAC) Bridges", IEEE Standards, IEEE Computer Society, Sponsored by the LAN/MAN Standards Committee, IEEE Std 802.1D-2004, (2004), 281 pgs.
"IEEE Standard for Local and Metropolitan Area Networks: Overview and Architecture", , IEEE Std 802c-2017Amendment 2: Local Medium Access Control (MAC) Address Usage, IEEE Standards Association, IEEE Computer Society, Sponsored by the LAN/MAN Standards Committee, (2017), 26 pgs.
"IEEE Standard for Low-Rate Wireless Networks", IEEE Computer Society, Sponsored by the LAN/MAN Standards Committee, IEEE Standards Association, IEEE Std 802.15.4-2015, (2016), 708 pgs.
"International Application Serial No. PCT/CN2018/071256, International Search Report dated Mar. 30, 2018", 4 pgs.
"International Application Serial No. PCT/CN2018/071256, Written Opinion dated Mar. 30, 2018", 4 pgs.
"European Application No. 18735912.0, Extended European Search Report dated Sep. 3, 2019", (dated Sep. 3, 2019), 8 pgs.
Sarikaya, Behcet, et al., "Adapting/Bridging 64-bit MACs with 48-bit MACs; new-64bitto48bitMACAdapting-sarikaya-0116-v00-xtn", IEEE Draft; New-64Bit to 48Bit MAC Adapting-Sarikaya-0116-V00-XTN, IEEE-SA, Piscataway, NJ USA, vol. 802, No. v00, Jan. 14, 2016, XP068103003, 20 pages, (Jan. 14, 2016), 20 pgs.
"Chinese Application No. 201880003864.5, First Office Action dated Feb. 3, 2020", (dated Feb. 3, 2020), 17 pgs.
"Chinese Application No. 2018800038645, Search Report dated Jan. 16, 2020", (dated Jan. 16, 2020), 3 pgs.
"Chinese Application No. 201880003864.5, Notice of Allowance dated Jan. 5, 2021", (dated Jan. 5, 2021), 1 pg.
"Chinese Application No. 201880003864.5, Notice of Allowance Search dated Dec. 9, 2020", (dated Dec. 9, 2020), 3 pgs.

* cited by examiner

| | | | | | | | EUI-48 | | EUI-64 |
|---|---|---|---|---|---|---|---|---|---|
| 10101410 | 11011110 | 01001010 | | | | | | | |
| MA-S BASE VALUE | | | | | | | | FF | FF |
| MA-L BASE VALUE | | | FF | FF | | Eui[3] | | Eui[4] | Eui[5] |
| MA-M BASE VALUE | | | | F | F | F | F | Eui[4] | Eui[5] |

| MESSAGE PARAMETER | OCTET |
|---|---|
| TABLE TRANSMIT | 1 |

FIG. 3

| MESSAGE PARAMETER | OCTET |
|---|---|
| DYNAMIC MAC ADDRESS | 1 |
| EUI-64 NODE ADDRESS | 7 |

FIG. 4

| | OCTET |
|---|---|
| DYNAMIC MAC ADDRESS | 1 |
| NODE EUI-64 | 7 |
| SERVER EUI-64 | 15 |
| SERVER EUI-48 | 23 |

FIG. 5

| MESSAGE PARAMETER | OCTET |
|---|---|
| CORRESPONDENT ADDRESS | 1 |

FIG. 6

| MESSAGE PARAMETER | OCTET |
|---|---|
| DYNAMIC MAC ADDRESS | 1 |
| SERVER EUI-64 | 7 |
| PORT | 15 |

*FIG. 7*

| MESSAGE PARAMETER | OCTET |
|---|---|
| CORRESPONDENT ADDRESS | 1 |

*FIG. 8*

| MESSAGE PARAMETER | OCTET |
|---|---|
| CORRESPONDENT ADDRESS | 1 |

*FIG. 9*

NETWORK BRIDGE BETWEEN DIFFERENT NETWORK COMMUNICATION PROTOCOLS

CLAIM OF PRIORITY

This application claims the benefit of priority under 35 U.S.C. § 119(e) of U.S. Provisional Patent Application Ser. No. 62/442,242, filed on Jan. 4, 2017, which is herein incorporated by reference in its entirety.

TECHNICAL FIELD

The present disclosure is related to network communication protocols, and in particular to bridging between different network communication protocols such as switching between the Institute of Electrical and Electronics Engineers (IEEE) 802.3 and 802.15.4 communication protocols.

BACKGROUND

As use of wireless devices in wireless communication networks continues to expand, it may become desirable for devices on one wireless network to communicate with devices that are arranged as a different wireless network. The two networks may communicate using different communication protocols, or there may be an intervening network that communicates using a different communication protocol. Network bridging protocols or bridges allow compatible interconnection of information technology equipment attached to separate networks that may implement different communication protocols.

SUMMARY

According to one aspect of the present disclosure, there is provided a computer implemented method of providing a communication bridge between a first network that communicates according to a first network protocol and a second network that communicates according to a second network protocol. The method comprises adapting communications between a device of the first network having a first size media access control (MAC) address and a device of the second network having a second size MAC address; and adapting a frame format of the first network protocol to a frame format of the second network protocol, including fragmenting data frames of the first network protocol when needed using a fragmentation format of the second network protocol.

Optionally, in the preceding aspect, another implementation of the aspect provides that the first network is an Institute of Electrical and Electronics Engineers (IEEE) 802.3 network, the second network is an IEEE 802.15.9 network, and wherein the fragmenting the data frames includes fragmenting IEEE 802.3 data frames when needed using IEEE 802.15.9 fragmentation.

Optionally, in the preceding aspect, another implementation of the aspect provides that the bridging is performed by an IEEE 802.1Q bridge.

Optionally, in any of the preceding aspects, another implementation of the aspect provides that the method further includes reassembly performed only at 802.15.4 end nodes.

Optionally, in any of the preceding aspects, another implementation of the aspect provides that the method further includes 64 bit to 48 bit MAC address adaptation using local or dynamic 48 bit MAC addresses.

Optionally, in any of the preceding aspects, another implementation of the aspect provides that the bridging is performed by translation bridges that keep a dynamic address table storing node and server 48 bit and 64 bit addresses.

Optionally, in any of the preceding aspects, another implementation of the aspect provides that the adapting MAC addresses comprises dynamic address generation.

Optionally, in any of the preceding aspects, another implementation of the aspect provides that the fragmenting includes fragmentation and reassembly using IEEE 802.15.9.

Optionally, in any of the preceding aspects, another implementation of the aspect provides that the bridges exchange dynamic address tables.

Optionally, in any of the preceding aspects, another implementation of the aspect provides a network coordinator device comprising: a processor; a memory; a first port to operatively couple the processor to first network that uses media access control (MAC) addresses of a first size; and a second port to operatively couple the processor to second network that uses MAC addresses of a second size, wherein the processor is configured to perform a network bridging protocol to bridge data frames communicated between the first network and the second network including: translate communications between a device of the first network having the first size MAC address and a device of the second network having the second size MAC address; and adapt a frame format of the first network protocol to a frame format of the second network protocol, including fragmenting data frames of the first network protocol when needed using a fragmentation format of the second network protocol.

Optionally, in any of the preceding aspects, another implementation of the aspect provides that the first network is an Institute of Electrical and Electronics Engineers (IEEE) 802.3 network that uses 48-bit media access control (MAC) addresses; and the second network is an IEEE 802.15.4 network that uses 64-bit MAC addresses.

Optionally, in any of the preceding aspects, another implementation of the aspect provides memory that stores a dynamic MAC address table, and wherein a table entry in the dynamic MAC address table includes a 48-bit dynamic MAC address and an associated 64-bit address for a node of the IEEE 802.15.4 network.

Optionally, in the preceding aspect, another implementation of the aspect provides memory with a table entry that further includes a 64-bit address for a server that communicates a data frame to the node and a 48-bit address for the server.

Optionally, in any of the preceding aspects, another implementation of the aspect provides a processor configured to broadcast a MAC translation message to request a dynamic address table from other network bridge devices connected to the IEEE 802.3 network and IEEE 802.15.4 network, and receive a table transmit message in response to the MAC translation message.

Optionally, in any of the preceding aspects, another implementation of the aspect provides a processor configured to broadcast the MAC translation message with empty address fields the first time the processor receives an IEEE 802.15.4 frame whose destination address is not an IEEE 802.15.4 server.

Optionally, in any of the preceding aspects, another implementation of the aspect provides a processor configured to receive a MAC translation message and transmit table transmit message in response to the MAC translation message, wherein the table transmit message includes one or more pairs of 48-bit and 64-bit MAC addresses.

Optionally, in any of the preceding aspects, another implementation of the aspect provides a processor configured to: receive a dynamic address request message from a node of the IEEE 802.15.4 network, wherein the dynamic address request message includes a static address for a server; and transmit a dynamic address reply message to the node in response to the dynamic address request message, wherein the dynamic address reply message includes 64-bit address and a dynamic MAC address that both correspond to the server.

Optionally, in any of the preceding aspects, another implementation of the aspect provides processor configured to: receive a server address request message from a node of the IEEE 802.15.4 network, wherein the server address request message includes a server address; transmit a server address replay message to the node in response to the server address request message, wherein the server address request message includes a new 64-bit address for the server; and update the dynamic MAC address table with the new server address.

Optionally, in any of the preceding aspects, another implementation of the aspect provides a processor configured to generate 64-bit addresses from 48-bit IEEE 802.3 addresses and detect address duplication in the generated 64-bit addresses.

Optionally, in any of the preceding aspects, another implementation of the aspect provides a processor configured to: receive an IEEE 802.3 data frame; fragment the IEEE 802.3 data frame into a plurality of IEEE 802.15.4 data frames using IEEE 802.15.9 fragmentation when the IEEE 802.3 data frame exceeds a maximum transmission unit (MTU) of the IEEE 802.15.4 network, and transmit the plurality of IEEE 802.15.4 data frames to a destination of the IEEE 802.3 data frame.

Optionally, in any of the preceding aspects, another implementation of the aspect provides a non-transitory computer-readable storage medium including instructions, that when performed by a processor of a network coordinator device, cause the network coordinator device to perform acts comprising: performing a network bridging protocol to bridge data frames communicated between an Institute of Electrical and Electronics Engineers (IEEE) 802.3 network that uses 48-bit media access control (MAC) addresses and an IEEE 802.15.4 network that uses 64-bit MAC addresses; and storing a dynamic MAC address table, wherein a table entry in the dynamic MAC address table includes a 48-bit dynamic MAC address and an associated 64-bit address for a node of the IEEE 802.15.4 network.

These non-limiting aspects can be combined in any permutation or combination.

BRIEF DESCRIPTION OF THE DRAWINGS

FIG. 3 is an example of a portion of a MAC Translation message.

FIG. 4 is an example of a portion of a Table Transmit message.

FIG. 5 is an example of an entry in a Dynamic MAC Address Table.

FIG. 6 is an example of a portion of a Dynamic_Address_Request message.

FIG. 7 is an example of a portion of a Dynamic_Address_Reply message.

FIG. 8 is an example of a portion of a Server_Address_Request message.

FIG. 9 is an example of a portion of a Server_Address_Reply message.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Figures 1, 2:
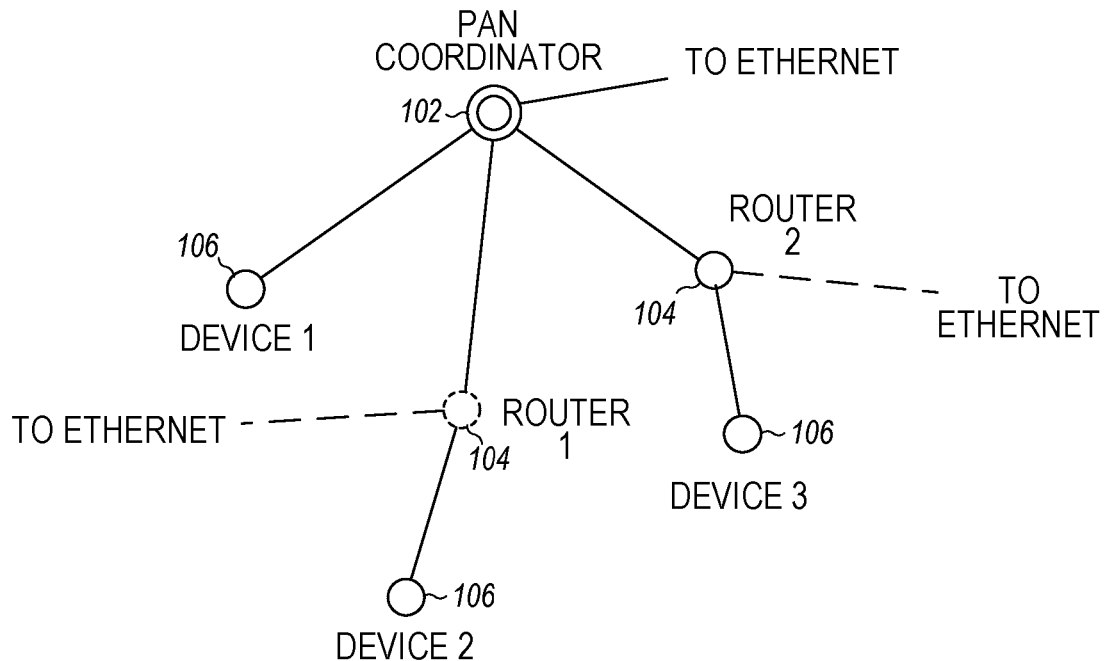
FIG. 1 is a diagram of an example of a wireless communication network.
FIG. 2 is a table showing an example of network address translation.

FIG. 1 is a diagram of an example of a wireless communication network. The network in the example includes a personal area network (PAN) coordinator device, routers 104, and end nodes 106. The network may be a home network and the PAN coordinator device 102 may provide a gateway to the home network. The end nodes 106 may include sensors that return a value of a physical measurement when queried, such as temperature for example. In another example, the network may be an industrial network that may include dozens or hundreds of wireless devices. The PAN coordinator 102, the routers 104, and the end nodes 106 may form an Internet of Things (IoT) network in which the devices communicate with each other using an IoT communication protocol (e.g., IEEE 802.15.4). The PAN coordinator 102 and possibly one or more of the routers 104 can also be connected to an Ethernet network, and they may communicate with one or more Ethernet networks using an Ethernet protocol (e.g., IEEE 802.3, IEEE 802.11).

Some Ethernet protocols use a 48-bit address space. As the use of wireless networks continues to expand, there is concern that the 48-bit address space is becoming exhausted. Consequently, the IEEE 802.15.4 IoT protocol uses a 64-bit address space. Network bridging protocols are described herein that interconnect individual IEEE 802.15.4 PANs using IEEE 802.3/802.11 networks, and also allow IEEE 802.3 and IEEE 802.11 endpoints to communicate with IEEE 802.15.4 endpoints. Bridges can provide compatible interconnection of information technology equipment attached to separate individual PANS and LANs. In the example of FIG. 1, one or more the PAN coordinator 102 and the routers 104 can be connected to an Ethernet network. The network bridging protocol can be included in the devices to translate between the IoT and the Ethernet networks. In some embodiments, the network bridging protocol operates as a finite state machine and operates completely in the open systems interconnection (OSI) layer 2 (data link layer) of the network devices. In some embodiments, the network bridging protocol is performed by an IEEE 802.1Q bridge.

The network bridging protocol or bridge may need to translate 48-bit addresses, e.g., translate addresses between 48-bit end points. The translating bridge may have multiple wireless PANS (WPANs) connected to different bridge ports. The dynamic addresses generated may be defined in IEEE Draft P802c/D1.1 and there may be duplicate MAC addresses when addresses are generated globally because local MAC addresses may not be globally unique. For multiple WPANs, all the translating bridges in the network may communicate with each other to agree on the range of 48-bit addresses available to each bridge. Translating bridges should generate dynamic MAC addresses only within the range of 48-bit addresses that is available to it.

The network bridging protocol or bridge may need to translate between 48 bit addresses and 64-bit addresses. If a 48-bit endpoint (e.g., a server) wishes to initiate a communication to a 64-bit device, the bridging protocol should translate the 48-bit address generated by the endpoint to a 64-bit address.

FIG. 2 is a table showing an example of network address translation. The endpoint may use extended unique identifier 48 (EUI-48) address formation. Dynamic MAC addresses are 48-bit MAC addresses where b2 in the first octet which is called Universal/Local (U/L) bit is set to 1, i.e. the address is a locally administered address as in IEEE Draft P802c/D1.1. The translating bridge may need to know the EUI-48 address formation details to generate the 64-bit address. If the EUI-48 address has been assigned a MAC address-Small (MA-S), it has 36 bits that are IEEE 802 assigned. This base value of 36 MA-S bits and following extension bits (12 bits) are copied to EUI-64 octet 0 (eui[0] of eui[0]-[7]) to EUI-64 octet 5 (eui[5]). The complete EUI-64 address value is generated by inserting the hexadecimal value of FFFF in eui[6] and eui[7]. Uniqueness of EUI-64 address values generated from MA-S IEEE 802 assigned EUI-48 values is guaranteed. There is no need to check for any collisions for these types of addresses generated.

If EUI-48 has been assigned an MAC address-Medium (MA-M), it has 28 bits that are IEEE 802 assigned. The first 24 bits are copied to the eui[0], eui[1] and eui[2] octets of EUI-64 address. The remaining 4 bits of the MA-M are concatenated with the hexadecimal value F and copied to eui[3]. The first 4 bits of eui[5] are set to the hexadecimal value F and the remaining 4 bits are set from the first 4 bits of the extension field of the EUI-48 address. The remaining 16 bits of the extension field are copied to eui[6] and eui[7] of the EUI-64 address. Uniqueness of EUI-64 address values generated from MA-M IEEE 802 assigned EUI-48 values is not guaranteed. The bridge may check for collisions for these types of addresses generated. In some embodiments, the translating bridge may detect address duplication, and substitute a different value for the hexadecimal F (e.g., hexadecimal E, etc.) when address duplication is detected.

If EUI-48 has been assigned an MAC address-Large (MA-L), it has 24 bits that are IEEE 802 assigned. These 24 MA-L bits are copied to the eui[0], eui[1] and eui[2] octets of the EUI-64 address. The hexadecimal value FFFF is inserted into eui[3] and eui[4]. 16 bits of the extension field of the EUI-48 address are copied to octets eui[6] and eui[7]. Uniqueness of EUI-64 values generated from MA-L IEEE 802 assigned EUI-48 values is not guaranteed, and the bridge may check for collisions for these types of addresses generated. In some embodiments, the bridge may substitute a different value for the hexadecimal FFFF (e.g., hexadecimal FFFE) when address duplication is detected.

The network bridging protocol processes frames arriving from an IEEE 802.15.4 WPAN and frames arriving from an IEEE 802.3/802.11 Ethernet network.

When a frame arrives from a WPAN, the destination address is a EUI-64 address. The destination address may be for a server or a non-server device (e.g., a WPAN end node). In the non-server case it can be assumed that this frame's destination does not exist in local WPAN (possibly due to 802.15.4 node mobility), but the destination is a node in another WPAN. This frame needs to be sent to a destination node in an Ethernet network that is connected to another WPAN. This destination node can be referred to as a displaced IoT node, and the destination MAC address may not be recorded for the IoT node.

The bridge may use a Dynamic MAC Address Table to track the destination addresses. When the case happens for the first time in which the destination is an unrecorded IoT node, the receiving bridge invokes a Dynamic MAC Address Table exchange protocol to update entries in the table. This synchronizes the MAC Address Tables of the translating bridges in the global network so that all translating bridges know all MAC Addresses being used in the local networks.

To update the dynamic address tables, a broadcast MAC translation message is broadcast by the bridge to request dynamic address tables from the other bridges. FIG. 3 is an example of a portion of a MAC Translation message. As shown in FIG. 3, the first octet of the MAC Translation message contains a table transmit field. This is followed by 6 octets for 48-bit MAC address and 8 octets for 64-bit MAC address fields which can be repeated.

When the bridge receives the first frame whose destination address is not a server EUI-64, the bridge sends the MAC Translation message with no address fields. This leads the bridge to initialize its dynamic address tables with all the dynamic addresses known so far.

The bridge that receives MAC Translation message sends a Table Transmit message. Table Transmit message is composed of pairs of 48-bit and 64-bit MAC addresses. FIG. 4 is an example of a portion of the Table Transmit message. As shown in FIG. 4, the message includes a 48-bit dynamic MAC address field in octets 1-6, and a 64-bit EUI-64 Node Address in octets 7-14. Dynamic MAC address field is of 48 bits length and EUI-64 Node Address is of 64 bits long. The table transmit message may carry as many pairs of addresses as the bridge can fit into an Ethernet data frame payload. The bridge that sends the Table Transmit Message sends all the entries in its dynamic address table until it reaches the maximum frame size allowed.

The bridge that receives the Table Transmit message updates its Dynamic MAC Address Table with the entries received in the message. FIG. 5 is an example of an entry in a Dynamic MAC Address Table. The entry includes a 48-bit Dynamic MAC Address in octets 1-6, a EUI-64 node address in octets 7-14, a 64-bit server address in octets 15-22, and a 48 bit server address in octets 23-28. For each pair of 48-bit and 64-bit MAC addresses received, the bridge adds an entry with 48-bit server EUI and 64-bit server EUI address fields set to zero. These zero values indicate that the entry is for a node (e.g., IoT end node) that has moved to another WPAN.

MAC Translation messages and Table Transmit messages are broadcast to all bridges on the LAN. The bridge which is not a translation bridge just ignores such messages.

The bridge stores all the entries it receives in the dynamic MAC address table with Server EUI-48 and Server EUI-64 fields in Dynamic MAC address table both set to zero. Next the bridge does a table look up for the destination address in the current frame. If it finds a match, it uses the dynamic address as the destination address to create an Ethernet frame.

The bridge does a table lookup for the source address in 802.15.4 frame in order to find the corresponding dynamic address. The bridge places this address as the source address in 802.3 frame. The sequence number in 802.15.4 frame is copied to the Ethernet frame's payload. Payload of 802.15.4 frame is copied to the remaining octets of Ethernet frame's payload. This frame is sent out to the bridge that has the moving 802.15.4 node. In this way, the frame is "tunneled" to the bridge to which the IoT node moved.

For all subsequent frames coming from the same source to the same destination the bridge processes them the same way: no new dynamic MAC address is generated and no tables need to be updated. The dynamic MAC address is retrieved from Dynamic Address Table, and the frames are tunneled to their destinations.

Dynamic MAC address table entries may be protected with a timeout parameter called Lifetime. The parameter is of Time Interval type, positive integral number of seconds. Initial value of Lifetime is 300 seconds which is set when a new entry is added to the table. It is decremented every second. When Lifetime value reaches zero a timeout event is created which results in the removal of the corresponding entry. Lifetime values and its encoding are all managed by the bridge management protocol.

The other case is when a frame arrives from an IEEE 802.15.4 WPAN in which the EUI-64 destination address is for a server. In this condition, the source node first has to query the bridge for an address for the server. The source node may be configured with a static address of the server (normally 48-bit EUI). The node sends a Dynamic_Address_Request (DAReq) message to the bridge with the address. FIG. 6 is an example of a portion of a DAReq message. The length of the correspondent address can be either 48-bits or 64-bits. The bridge replies with Dynamic_Address_Reply (DARep) message. FIG. 7 is an example of a portion of a DARep message. In the DARep message, the bridge provides a 64-bit and a dynamic MAC address corresponding to the server, and server a port number in the reply. The port number can be a 12-bit port number.

The bridge creates a 48-bit dynamic address for the sending 802.15.4 node, as explained previously. When a new dynamic address is created, the bridge adds a new entry to Dynamic MAC Address Table. The source address in the 802.15.4 frame and the server 64-bit and 48-bit addresses are also added to the entry in the Dynamic MAC Address Table.

The source node starts sending frames to the server. It uses the 64-bit address it received from the bridge as the destination address. The bridge looks up the received 64-bit address in the dynamic address table. It finds the corresponding entry and retrieves 48-bit server address and uses the 48-bit server address as the destination address of the Ethernet frame that is sent out by the bridge. The source address is the dynamic MAC address that was found in the table. The bridge creates the source address as described previously herein.

It should be noted that the dynamic MAC address is created only if this frame is the first frame going out to the same destination. If not, the dynamic MAC address for the server is retrieved from the dynamic MAC Address Table that the bridge maintains.

When the WPAN source node sends a frame with an EUI-64 server address, there may be a server EUI-64 address collision. The source node may detect the server EUI-64 address collision when the node does not receive an acknowledgement frame for the data frame it sends to the server. In this case, the node proceeds to get a new address for the destination server. The node sends a Server_Address_Request message to the bridge. FIG. 8 is an example of a portion of a Server_Address_Request message. The correspondent address of the destination server is included in the message is 64-bits. The bridge looks up the received address in Dynamic MAC address table and finds the node's EUI-64 and the corresponding server 48 and 64 bit addresses. This table look-up shows that the previous address is included in a collision.

In response, the bridge generates another EUI-64 for the server. It replies with Server_Address_Reply message. FIG. 9 is an example of a portion of a Server_Address_Reply message. The bridge sends a new 64-bit address to the source node in the Server_Address_Reply message, and the bridge updates the Dynamic Address Table with the new address.

So far, the processing by the network bridging protocol of frames arriving from an IEEE 802.15.4 WPAN has been discussed. The network bridging protocol also process frames arriving from an Ethernet network. When a frame arrives from Ethernet, the bridge checks the destination address. Incoming frames from an Ethernet network may include a destination address that is a EUI-64 device address (e.g., for an IoT node), or may include a destination address that is a 48-bit dynamic MAC address. Another case is the source of the incoming frame is a WPAN node (e.g., an IoT end node) and the bridge does not have a match for the dynamic MAC address of the destination. Operation of the Bridging protocol is described for each of these cases.

If the incoming frame is from an Ethernet 48-bit node and the destination address is a EUI-64 address of a WPAN node, the bridge treats this as Internet initiated communication with a device in 802.15.4 network.

If a 48-bit node wants to communicate with a device in 802.15.4 PAN, the initiating 48-bit node may first get a 48-bit dynamic MAC address by sending Dynamic_Address_Request message to the bridge as discussed previously in regard to FIG. 6.

The bridge receives the Dynamic_Address_Request message from 48-bit node. The bridge treats this 48-bit node as server. The bridge generates a dynamic MAC address and adds a new table entry to its Dynamic Address table. The Node EUI-64 value of the table entry is filled using the Correspondent Address parameter included in the Dynamic_Address_Request message. The Server EUI-48 value of the new table entry is filled using the source address of the Dynamic_Address_Request message. The bridge generates a 64-bit address corresponding to the server EUI-48 and places it in the Server EUI-64 of the new table entry.

The bridge sends Dynamic_Address_Reply message to the node as discussed previously in regard to FIG. 7. The bridge provides a dynamic MAC address, a Server EUI-64 address, and a port number in the Dynamic_Address_Reply message. The 48-bit node may include the EUI-64 address of the device as the destination address in the frame.

The 48-bit node may include the returned dynamic MAC address as the destination address in the frame. In this case, the address of the 48-bit node is in the source address field. The resulting frame is treated by the bridge like a frame coming from a server for the EUI-64 devices in the IEEE 802.15.4 WPAN. This case where the incoming frame includes a dynamic MAC address as the destination address is described next.

If the destination address of the incoming frame is a dynamic MAC address, the receiving bridge checks its dynamic MAC address table and finds the corresponding EUI-64 node address. The bridge sets the destination field of the IEEE 802.15.4 frame to this EUI-64 address (in long address form). The bridge retrieves the server EUI-64 field from the Dynamic MAC address table and places it as the source address (in long address form) in the IEEE 802.15 data frame.

The data payload field of the 802.15.4 frame is set by copying the data field of the IEEE 802.3 frame. The data sequence number field is copied from the frame received. The resulting frame is sent over the air to the destination IEEE 802.15.4 WPAN. Fragmentation of the IEEE 802.3 frame may be needed if the payload in Ethernet frame exceeds the maximum transmission unit (MTU) size of the IEEE 802.15.4 link. Fragmentation is discussed below.

The third case is when the source of the incoming frame is a WPAN node of another bridge. When the Ethernet frame is received, the receiving bridge looks up the destination address in the Dynamic MAC address table. After looking up its Dynamic MAC address table and finding a match, if the server address fields are zero then the receiving bridge determines that this frame is coming from another IEEE 802.15.4 node. The bridge creates an IEEE 802.15.4 frame in which the destination address is the EUI-64 address in the table entry. The bridge looks up the source address in the table and finds the 64-bit node address for the source. The bridge places the 64-bit node address as the source address in the IEEE 802.15.4 frame.

The first octet in the payload of the Ethernet frame carries the sequence number that the source IEEE 802.15.4 node has assigned to the payload. The sequence number field in the IEEE 802.15.4 frame is set to the sequence number of the received Ethernet frame. The rest of the payload in the Ethernet frame is copied to the IEEE 802.15.4 frame as its payload. The resulting 802.15.4 frame is sent to the WPAN over the air interface.

As indicated above, fragmentation of an incoming IEEE 802.3 frame may be needed if the payload in Ethernet frame exceeds the MTU size in the IEEE 802.15.4 link. Translating bridge may use a fragmentation algorithm such as the IEEE 802.15.9 fragmentation algorithm to fragment data frames that have sizes exceeding the IEEE 802.15.4 MTU. Reassembly will be made by the end node in the WPAN.

The bridge divides the data frame size by the MTU and generates that many fragmented frames plus one. In each fragmented frame, a MAC protocol information element (MP IE) is added. The transfer type in the MP IE (the first three bits in the MP IE) is set to 0b010 for the first and middle fragmented frames and to 0b100 for the last fragmented frame. Each fragmented frame (except possibly the last fragmented frame) carries the number of data bytes equal to the MTU size. Octet 1 of MP IE carries the fragment number. The first fragment carries the fragment number of 0b00. Fragmented frames are sent consecutively and no buffering is assumed at the receiving IEEE 802.15.4 end node.

Packets being sent from an IEEE 802.15.4 end point may also use fragmentation. The WPAN end nodes may use the IEEE 802.15.9 fragmentation algorithm. The translating bridge recognizes the MP IE in the WPAN frames. The translating bridge does not perform any reassembly of fragmented frames, and transmits the frames to the destination without reassembly. The WPAN end nodes perform 802.15.9 reassembly.

Packets being sent from an IEEE 802.15.4 end point may use fragmentation to send the full multi-MTU message as a single packet to be forwarded over an Ethernet network to another IEEE 802.15.4 end point. This can be useful for frames such as key management frames.

To adapt the IEEE 802.15 frame to the IEEE 802.3 format, the data payload in the IEEE 802.15 MAC frame can be copied to the IEEE 802.3 frame data field. Because there is no sequence number field in the IEEE 802.3 frame, the Sequence Number field and the Frame Payload field in the IEEE 802.15 frame are copied together into the IEEE 802.3 frame Payload field. The Ethertype field in the IEEE 802.3 frame is set to a value indicating IEEE 802.15 to IEEE 802.3 encapsulation. The resulting IEEE 802.3 frame is sent over Ethernet network to the destination bridge. The destination bridge will check Ethertype value and will de-capsulate the frame by copying the first octet to the Sequence Number field and the remaining octets to the Frame Payload field in the new IEEE 802.15 frame. The resulting 802.15 frame is sent over the air to the IEEE 802.15 WPAN.

Control frames or MAC command frames are sent only if the translating bridge is configured to send MAC command frames otherwise MAC command frames are simply dropped. When MAC command frame forwarding is enabled in the bridge, the bridge sends MAC command frames to the other translating bridges with encapsulation.

The destination address is a 48-bit MAC address of the translating bridge. The encapsulation is indicated in the Ethertype field of the Ethernet frame. The receiving bridge de-capsulates the frame and sends the resulting IEEE 802.15.4 MAC command frame to the WPAN.

The embodiments described herein provide an OSI Layer 2 network bridging protocol that includes 64-bit to 48-bit MAC address adaptation using local or dynamic 48 bit MAC addresses. Each translation bridge keeps a dynamic address table that stores node and server 48-bit and 64-bit addresses.

The network bridging protocol also include dynamic address generation, frame format adaptation, and exchange of dynamic address tables among the bridges of the global network. The bridging protocol also supports IEEE 802.15.9 fragmentation and reassembly.

Figure 10:
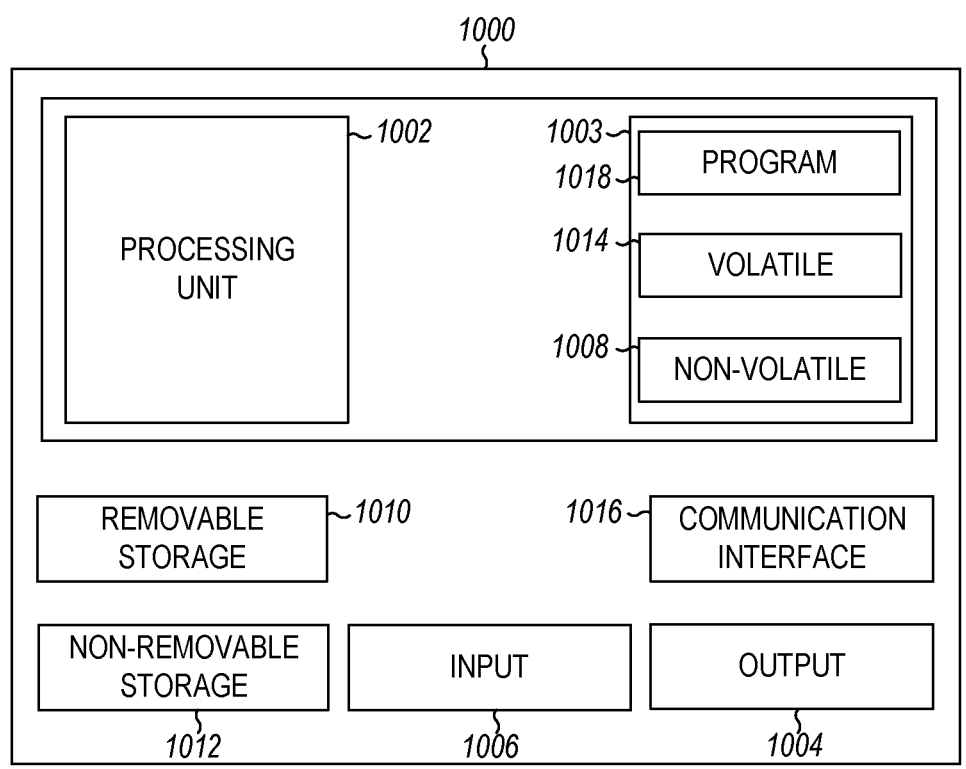
FIG. 10 is a block diagram illustrating circuitry for performing network bridging protocols according to example embodiments.

FIG. 10 is a block diagram illustrating circuitry for performing methods according to example embodiments. All components need not be used in various embodiments.

One example computing device in the form of a computer 1000 may include a processing unit 1002, memory 1003, removable storage 1010, and non-removable storage 1012. Although the example computing device is illustrated and described as computer 1000, the computing device may be in different forms in different embodiments. For example, the computing device may instead be a smartphone, a tablet, smartwatch, or other computing device including the same or similar elements as illustrated and described with regard to FIG. 10. Devices, such as smartphones, tablets, and smartwatches, are generally collectively referred to as mobile devices or user equipment. Further, although the various data storage elements are illustrated as part of the computer 1000, the storage may also or alternatively include cloud-based storage accessible via a network, such as the Internet or server based storage.

Memory 1003 can be configured to store a data structure such as a dynamic MAC address table as described herein. Memory 1003 may include volatile memory 1014 and non-volatile memory 1008. Computer 1000 may include—or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions, including instructions that configure the processing unit 1002 to perform embodiments of network bridging protocols described herein.

Computer 1000 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, mouse, keyboard, camera, one or more device-specific buttons, one or more sensors integrated within or coupled via wired or wireless data connections to the computer 1000, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 1002 of the computer 1000. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage such as a storage area network (SAN) indicated at 1020.

Figure 11:
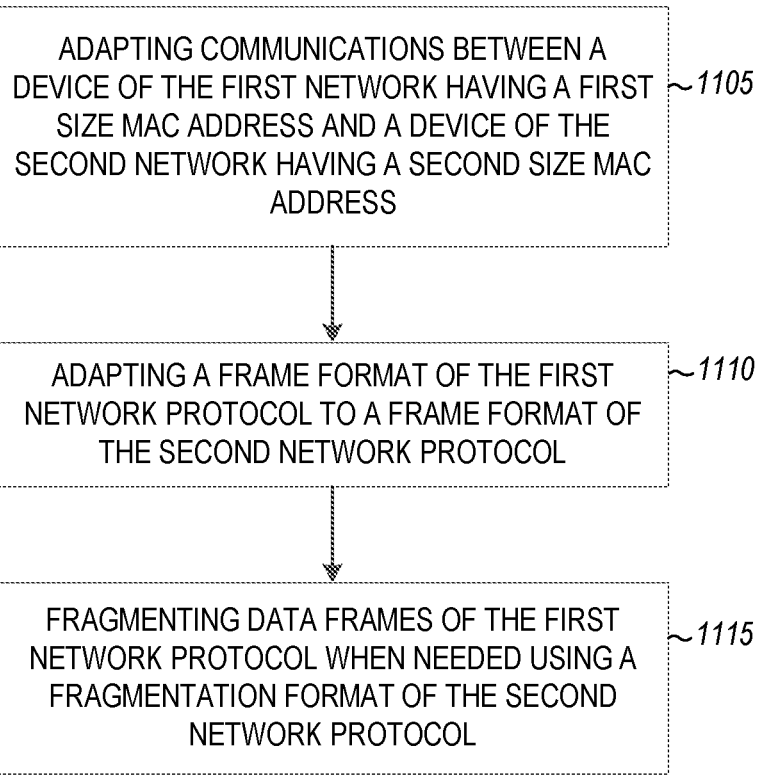
FIG. 11 is a flow diagram of a computer implemented method to perform network protocol bridging.

FIG. 11 is a flow diagram of a computer implemented method 1100 to provide a communication bridge between a first network that communicates according to a first network protocol and a second network that communicates according to a second network protocol. At operation 1105, communications are adapted between a device of the first network having a first size MAC address and a device of the second network having a second size MAC address. In some aspects, the first network is an IEEE 802.3 network, and the second network is an IEEE 802.15.9 network. Bridging between the networks may be performed by adapting communications between 64-bit MAC address stations of the IEEE 802.15.9 network and 48-bit MAC address stations of the IEEE 802.3 network. The bridge may use a Dynamic MAC Address Table to track the destination addresses.

In some embodiments, a bridging device may use extended unique identifier 48 (EUI-48) address formation to generate address translations for the Address Table. The MAC addresses may be dynamic 48-bit MAC addresses. The translating bridge may need to know the EUI-48 address formation details to generate the 64-bit address. For example, if the EUI-48 address has been assigned a MAC address-Small (MA-S), the 36 MA-S bits and following extension bits (12 bits) are copied to EUI-64 octet 0 (eui[0] of eui[0]-[7]) to EUI-64 octet 5 (eui[5]) to generate the 64-bit EUI address.

In another example, if the EUI-48 has been assigned an MAC address-Medium (MA-M), the first 24 bits of the assigned MA-M are copied to the eui[0], eui[1] and eui[2] octets of EUI-64 address. The remaining 4 bits of the assigned MA-M are concatenated with the hexadecimal value F and copied to eui[3]. The first 4 bits of eui[5] are set to the hexadecimal value F and the remaining 4 bits are set from the first 4 bits of the extension field of the EUI-48 address. The remaining 16 bits of the extension field are copied to eui[6] and eui[7] to generate the 64-bit EUI address.

In a further example, if the EUI-48 has been assigned an MAC address-Large (MA-L), the assigned 24 MA-L bits are copied to the eui[0], eui[1] and eui[2] octets of the EUI-64 address. The hexadecimal value FFFF is inserted into eui[3] and eui[4]. 16 bits of the extension field of the EUI-48 address are copied to octets eui[6] and eui[7] to generate the 64-bt EUI address.

Returning to FIG. 11 at operation 1110, the frame format of the first network protocol is adapted to the frame format of the second network protocol. At operation 1115, the frame formatting includes fragmenting data frames of the first network protocol when needed using a fragmentation format of the second network protocol. Fragmentation of frames may be needed if the payload in a frame exceeds the MTU size in a link between protocols. Reassembly will be made by the end node.

In some aspects, the first network protocol is the IEEE 802.3 protocol and the second protocol is the IEEE 802.15.9 protocol, and IEEE 802.3 data frames are fragmented when needed using IEEE 802.15.9 fragmentation. In IEEE 802.15.9 fragmentation, the bridge divides the data frame size by the MTU and generates that many fragmented frames plus one. The fragmented frames can be sent consecutively. To adapt the IEEE 802.15 frame to the IEEE 802.3 format, the Sequence Number field and the Frame Payload field in the IEEE 802.15 frame are encapsulated into the IEEE 802.3 frame Payload field. The destination bridge de-capsulates the frame.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A network coordinator device comprising:
   a processor;
   a memory containing instructions for execution by the processor;
   a first port to operatively couple the network coordinator device to a first network that uses first media access control (MAC) addresses of a first size; and a second port to operatively couple the network coordinator device to a second network that uses second MAC addresses of a second size different from the first size; and wherein the processor executes the instructions to perform a network bridging protocol to bridge data frames communicated between the first network and the second network including:

translate communications between a device of the first network having the first MAC addresses and a device of the second network having the second MAC addresses, including translating a first MAC address of the first network to a second MAC address of the second network using a first translation format when the first MAC address is assigned a first address formation size and includes a first extended unique identifier (EUI), and translating the first MAC address to the second MAC address using a second translation format different from the first translation format when the first MAC address is assigned a second address formation size and includes a second EUI different from the first EUI; and adapt a frame format of a first network protocol of the first network to a frame format of a second network protocol of the second network, including fragmenting data frames of the first network protocol when needed using a fragmentation format of the second network protocol.

2. The network coordinator device of claim 1, wherein the first network is an Institute of Electrical and Electronics Engineers (IEEE) 802.3 protocol compatible network that uses 48-bit media access control (MAC) addresses; and the second network is an IEEE 802.15.4 protocol compatible network that uses 64-bit MAC addresses.

3. The network coordinator device of claim 2, wherein the memory stores a dynamic MAC address table, and wherein a table entry in the dynamic MAC address table includes a 48-bit dynamic MAC address and an associated 64-bit address for a node of the IEEE 802.15.4 protocol compatible network.

4. The network coordinator device of claim 3, wherein the table entry further includes a 64-bit address for a server that communicates a data frame to the node and a 48-bit address for the server.

5. The network coordinator device of claim 3, wherein the processor executes the instructions to broadcast a MAC translation message to request a dynamic address table from other network bridge devices connected to the IEEE 802.3 protocol compatible network and the IEEE 802.15.4 protocol compatible network, and receive a table transmit message in response to the MAC translation message.

6. The network coordinator device of claim 5, wherein the processor executes the instructions to broadcast the MAC translation message with empty address fields the first time the processor receives an IEEE 802.15.4 frame whose destination address is not an IEEE 802.15.4 server.

7. The network coordinator device of claim 2, wherein the processor executes the instructions to receive a MAC translation message and transmit a table transmit message in response to the MAC translation message, wherein the table transmit message includes one or more pairs of 48-bit and 64-bit MAC addresses.

8. The network coordinator device of claim 2, wherein the processor executes the instructions to:

receive a dynamic address request message from a node of the IEEE 802.15.4 protocol compatible network, wherein the dynamic address request message includes a static address for a server; and transmit a dynamic address reply message to the node in response to the dynamic address request message, wherein the dynamic address reply message includes 64-bit address and a dynamic MAC address that both correspond to the server.

9. The network coordinator device of claim 2, wherein the processor is configured to:

receive a server address request message from a node of the IEEE 802.15.4 protocol compatible network, wherein the server address request message includes a server address;

transmit a server address reply message to the node in response to the server address request message, wherein the server address request message includes a new 64-bit address for the server; and update the dynamic MAC address table with the new server address.

10. The network coordinator device of claim 2, wherein the processor is configured to generate 64-bit addresses from 48-bit IEEE 802.3 addresses and initiate detection of address duplication in the generated 64-bit addresses according to the address formation information of the first size MAC addresses.

11. The network coordinator device of claim 2, wherein the processor is configured to: receive an IEEE 802.3 data frame; fragment the IEEE 802.3 data frame into a plurality of IEEE 802.15.4 data frames using IEEE 802.15.9 fragmentation when the IEEE 802.3 data frame exceeds a maximum transmission unit (MTU) of the IEEE 802.15.4 network, and transmit the plurality of IEEE 802.15.4 data frames to a destination of the IEEE 802.3 data frame.

12. A computer implemented method of providing a communication bridge between a first network that communicates according to a first network protocol and a second network that communicates according to a second network protocol, the method comprising:

adapting communications between a device of the first network having first media access control (MAC) addresses of a first size and a device of the second network having second size MAC addresses of a second size, including translating a first MAC address of the first network to a second MAC address of the second network using a first translation format when the first MAC address is assigned a first address size and includes a first extended unique identifier (EUI), and translating the first MAC address to the second MAC address using a second translation format different from the first translation format when the first MAC address is assigned a second address size and includes a second EUI different from the first EUI; and adapting a frame format of the first network protocol to a frame format of the second network protocol, including fragmenting data frames of the first network protocol when needed using a fragmentation format of the second network protocol.

13. The method of claim 12, wherein the first network is an Institute of Electrical and Electronics Engineers (IEEE) 802.3 protocol compatible network, the second network is an IEEE 802.15.9 protocol compatible network, and wherein the fragmenting the data frames includes fragmenting IEEE 802.3 data frames when needed using IEEE 802.15.9 fragmentation.

14. The method of claim 13, including reassembly of the fragmented data frames, wherein the reassembly is performed only at 802.15.4 end nodes of a IEEE 802.15.4 protocol compatible network.

15. The method of claim 13, wherein the adapting communications includes 64 bit to 48 bit MAC address adaptation using local or dynamic 48 bit MAC addresses.

16. The method of claim 13 wherein bridging is performed by translation bridge devices including a dynamic address table to store node and server 48 bit and 64 bit addresses.

17. The method of claim 13, wherein adapting MAC addresses comprises dynamic address generation.

18. The method of claim 13, wherein the communication bridge is provided by an IEEE 802.1Q bridge device, and the fragmenting includes fragmentation and reassembly using IEEE 802.15.9.

19. The method of claim 13, wherein bridges exchange dynamic address tables.

20. A non-transitory computer-readable storage medium including instructions, that when performed by a processor of a network coordinator device, cause the network coordinator device to perform acts comprising:

performing a network bridging protocol to bridge data frames communicated between an Institute of Electrical and Electronics Engineers (IEEE) 802.3 protocol compatible network that uses 48-bit media access control (MAC) addresses and an IEEE 802.15.4 protocol compatible network that uses 64-bit MAC addresses;

generating the 64 bit MAC addresses to a first 64 bit MAC address format when the 48-bit MAC addresses were assigned a first MAC address size when formed, and generating the 64 bit MAC addresses to a second 64 bit MAC address format when the 48-bit MAC addresses were assigned a second MAC address size when formed;

translating a first MAC address of the first network to a second MAC address of the second network using a first translation format when the first MAC address is assigned a first address formation size and includes a first extended unique identifier (EUI), and translating the first MAC address to the second MAC address using a second translation format different from the first translation format when the first MAC address is assigned a second address formation size and includes a second EUI different from the first EUI; and storing a dynamic MAC address table, wherein a table entry in the dynamic MAC address table includes a 48-bit dynamic MAC address and an associated 64-bit address for a node of the IEEE 802.15.4 network.

\* \* \* \* \*